United States Patent
Dejima et al.

(10) Patent No.: US 7,484,873 B2
(45) Date of Patent: Feb. 3, 2009

(54) ILLUMINATION DEVICE HAVING ELLIPTICAL BODY AND DISPLAY DEVICE USING THE SAME

(75) Inventors: Norihiro Dejima, Chiba (JP); Makoto Kurihara, Chiba (JP); Takayasu Sado, Chiba (JP); Katsunori Honma, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 11/209,925

(22) Filed: Aug. 23, 2005

(65) Prior Publication Data

US 2006/0062016 A1   Mar. 23, 2006

(30) Foreign Application Priority Data

Aug. 25, 2004   (JP)   ............................. 2004-245237
Jul. 21, 2005   (JP)   ............................. 2005-210871

(51) Int. Cl.
*F21V 7/08* (2006.01)
(52) U.S. Cl. ........................................ 362/606; 362/610
(58) Field of Classification Search ................ 362/600, 362/606, 607, 608, 610, 621, 626; 385/39, 385/129, 146
See application file for complete search history.

(56) References Cited

U.S. PATENT DOCUMENTS

| | | | | |
|---|---|---|---|---|
| 3,437,804 A | * | 4/1969 | Schaefer et al. ............. | 362/551 |
| 4,389,698 A | * | 6/1983 | Cibie .......................... | 362/511 |
| 5,718,497 A | | 2/1998 | Yokoyama et al. ............ | 362/31 |
| 5,860,723 A | * | 1/1999 | Domas et al. ................ | 362/346 |
| 6,454,452 B1 | * | 9/2002 | Sasagawa et al. ............ | 362/561 |
| 6,850,095 B2 | * | 2/2005 | Sayers et al. ................. | 362/551 |
| 6,937,791 B2 | * | 8/2005 | Guy .............................. | 385/33 |
| 6,979,095 B2 | * | 12/2005 | Min et al. .................... | 362/611 |
| 2004/0170011 A1 | * | 9/2004 | Kim et al. ...................... | 362/31 |
| 2005/0180165 A1 | * | 8/2005 | Sado et al. ................... | 362/606 |
| 2005/0201114 A1 | * | 9/2005 | Komatsu ..................... | 362/509 |
| 2006/0002141 A1 | * | 1/2006 | Ouderkirk et al. ........... | 362/609 |

FOREIGN PATENT DOCUMENTS

| | | |
|---|---|---|
| JP | 2780046 | 1/1991 |
| JP | 2000249837 | 9/2000 |
| WO | 0214796 | 2/2002 |

* cited by examiner

*Primary Examiner*—Ismael Negron
(74) *Attorney, Agent, or Firm*—Adams & Wilks

(57) ABSTRACT

An illumination device for emitting light includes a light incident body having a first end portion that has a light incident surface on which light from a light source is incident, a second end portion, and an outer oval-shaped surface portion interconnection the first and second end portions. A light guide plate is optically coupled to the second end portion of the light incident body and has a light emitting surface through which light that propagates through the light incident body is emitted. The light guide plate and the light incident body are integrally formed and may comprise a one-piece body. A display device utilizes the illumination device for illuminating a display element of the non-self light emitting type.

16 Claims, 9 Drawing Sheets

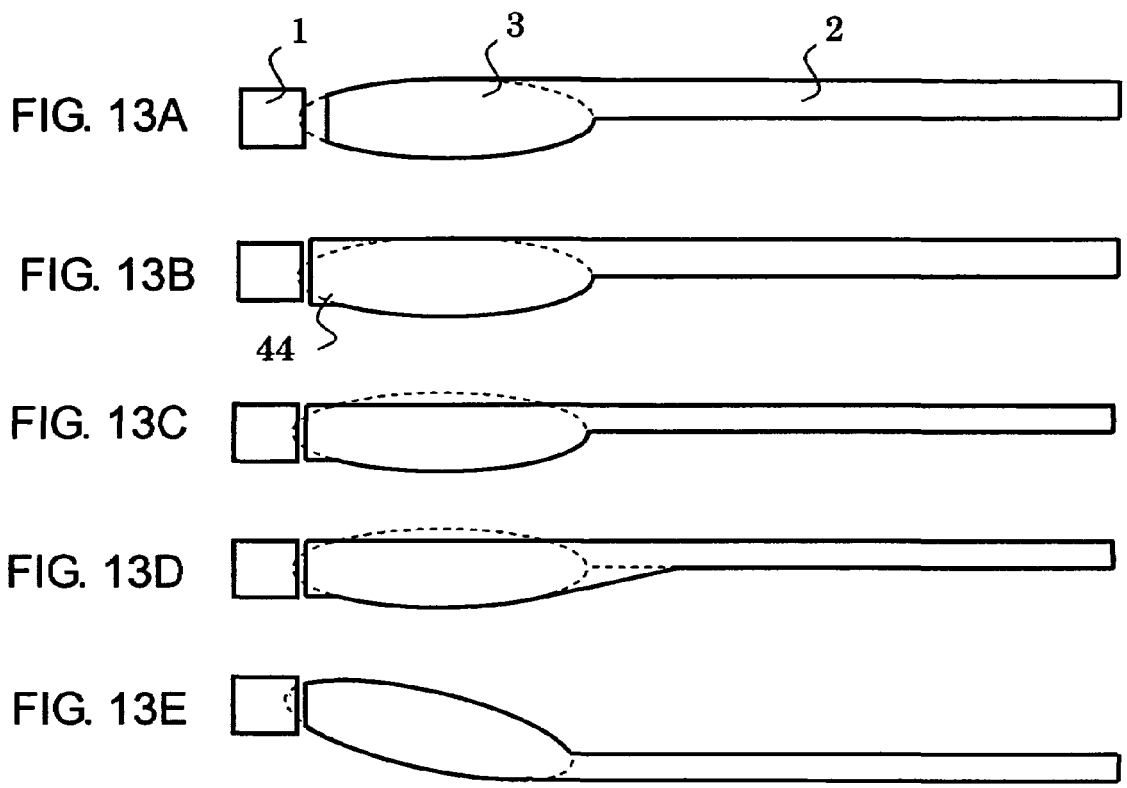
FIG. 13A
FIG. 13B
FIG. 13C
FIG. 13D
FIG. 13E
FIG. 14
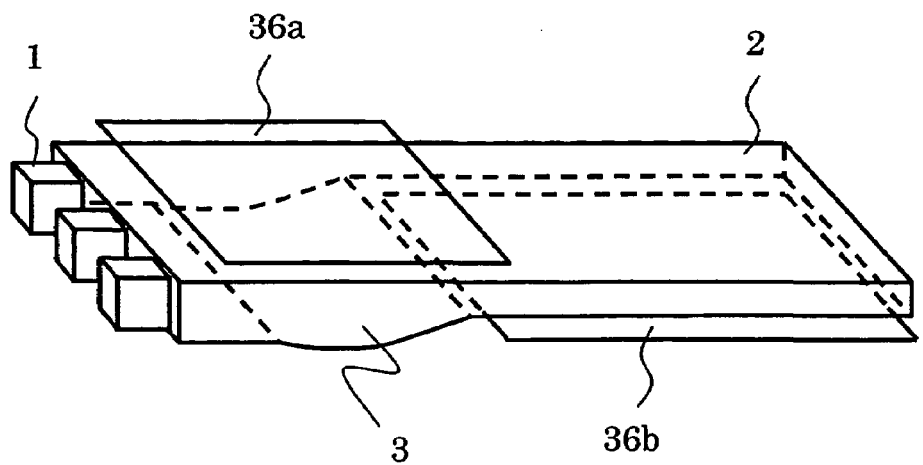

ILLUMINATION DEVICE HAVING ELLIPTICAL BODY AND DISPLAY DEVICE USING THE SAME

BACKGROUND OF THE INVENTION

1. Field of the Invention

The present invention relates to an illumination device for use in a mobile phone, a portable TV set, a hand-held game machine, a personal digital assistant (PDA), and a notebook personal computer, and to a display device using the same.

2. Description of the Related Art

Known examples of a conventional illumination device which is called a backlight or a frontlight include a side light type illumination device in which a plurality of LED light sources are disposed on a side of a light guide plate as the light source. For example, an illumination device for use in a portable information device such as a mobile phone is required to be thinner. However, since it is difficult to make thinner an LED as the light source, it is difficult to realize a thinner illumination device or a thinner display device. One approach to solving the problem is disclosed in JP 2000-249837 A where a wedge-like light guiding portion couples an ordinary-sized LED and a thin light guide plate.

In an illumination device having a conventional wedge-like light guiding portion, the angle of incidence of propagating light with respect to a reflecting surface becomes greater as the light is repeatedly reflected by the inner surfaces of the light guiding portion, so the amount of light propagating through the light guide plate with the angle of incidence being greater than the critical angle decreases, and thus, light cannot be efficiently guided from the light source to the light guide plate.

Further, a greater angle of incidence of propagating light results in a greater amount of leakage light to the outside from the light guiding portion and adjacent areas. Therefore, unevenness in brightness and stray light increase, and satisfactory illumination cannot be carried out.

Still further, the number of reflections of light inside the light guide plate is large. Thus, if a group of conventional parallel sawtooth prisms are formed on the light guide plate, it is difficult to form an even distribution of emitted light.

SUMMARY OF THE INVENTION

According to the present invention, an illumination device includes a light source, a light incident body, and a light guide plate coupled to the light incident body at an end portion for evenly emitting light, which is incident from the light incident body, from a light emitting surface. The light incident body has a light incident surface opposing the light source and is perpendicular to a light emitting surface of the light guide plate, and the outside shape of the light incident body between the light incident surface and the light guide plate is oval. This structure allows efficient coupling between a light source of a conventional size and a thin light guide plate thinner than the light source. Even propagating light is repeatedly reflected inside the light incident body, the light can propagate efficiently into the thin light guide plate without a considerable influence on the distribution of the angle of incidence with respect to the light guide plate.

Further, the light incident surface of the light incident body is formed so as to be located between an anterior focal point on the side of the light source and the center of the oval portion forming the light incident body, while a coupling portion between the light incident body and the light guide plate is formed so as to be located near another focal point, a posterior focal point. This arrangement allows light which passes near one of the focal points to, after being reflected by the oval surface of the light incident body, pass near the other focal point, and thus, light emitted from the light source can propagate efficiently into the light guide plate.

Further, the illumination device is formed such that a light emitting surface of the light source is located between the anterior focal point and the light incident surface. With such a structure, since light emitted from the light source in the light incident body is substantially equivalent to light emitted from near the anterior focal point, light emitted from the light source can propagate efficiently into the light guide plate.

Further, in the coupling portion between the light incident body and the light guide plate, a surface of the light guide plate on a side of the light emitting surface and a surface of the light guide plate on an opposing side are coupled to the oval portion by a pair of wedge-like planes having a tapered thickness from the light incident body towards the light guide plate. With such a structure, light reflected in the light incident body can be prevented from returning to the side of the light source, and can be propagated into the light guide plate, thereby improving the efficiency of utilizing light.

Particularly, in a cross section in the direction perpendicular to the light incident surface and to the light emitting surface of the light guide plate, end portions of the pair of wedge-like planes on the side of the light source are formed from locations near points of intersection between lines that pass through the posterior focal point and form a critical angle with the light guide plate and a surface of the oval portion. Accordingly, light reflected inside the light incident body is almost totally guided to the light guide plate at an angle equal to or greater than the critical angle, thereby improving not only the efficiency of utilizing light but also propagation characteristics of light inside the light guide plate.

Further, in the coupling portion between the light incident body and the light guide plate, a pair of light reflecting layers are provided to oppose the pair of wedge-like planes and a part of the light guide plate. With such a structure, influence of inverse light and light leakage is suppressed to realize an illumination device having a small loss.

Further, a top of the light incident body is flush with the light emitting surface of the light guide plate, thereby allowing light repeatedly reflected inside the light incident body to propagate efficiently into the light guide plate. Accordingly, the efficiency of utilizing light is improved.

Further, a longitudinal direction of the oval shape of the light incident body and the light emitting surface of the light guide plate are not in parallel to each other and form an angle. With this structure, even when the light source and the light guide plate are at different levels, light emitted from the light source can propagate efficiently into the light guide plate.

Further, a light reflector is inserted in a gap between the light incident surface and the light source, the light incident surface side of which light reflector is a light reflecting layer provided with openings sized correspondingly to the light emitting surface of light sources, the openings being provided at locations corresponding to the respective light sources. Accordingly, light reflected in the light incident body multiple times can be prevented from escaping through the light incident surface to the outside, and thus, the efficiency of utilizing light can be improved.

According to the illumination device of the present invention, since the light source is provided near the anterior focal point, if the ellipticity of the oval surface forming the light incident body is large, there is a large gap between the light source and the light incident surface. Therefore, in some cases, light from the light source does not propagate efficiently into the light incident body. Hence, a light reflector covering the light source and the light incident body and having a light reflecting layer formed on the inner surface thereof is provided so as to enclose the space between the light source and the light incident surface. This structure allows light which would otherwise leak to the outside from between the light source and the light incident surface to return to the optical path to be reused.

Further, in order to reuse light which leaks to the outside from a side surface of the light guide plate, a light reflecting layer is provided on three side surfaces perpendicular to the light emitting surface of the light guide plate and to the light incident surface or provided adjacent to the three side surfaces.

Further, with a structure where the shape of the light incident body adjacent to the light incident surface is a part of a rectangle in cross section in the direction perpendicular to the light incident surface and to the light emitting surface of the light guide plate, the gap between the light source and the light incident body can be minimized without loss of propagation characteristics. As a result, light can propagate efficiently into the thin light guide plate.

Further, by providing the light reflecting layer so as to oppose a surface of the light guide plate opposite to the light emitting surface, leakage light from the underside of the light guide plate can be reused, and as a result, the efficiency of utilizing light can be improved.

On the other hand, by forming into the light guide plate a plurality of concave micro-structures for light-scattering having a longitudinal direction on the surface of the light guide plate opposite to the light emitting surface, an illumination device can be formed which can emit light with a high efficiency even when used in combination with a point-source light such as an LED and a thin light guide plate.

In particular, when a point-source light such as an LED is used as the light source, since light incident on the micro-structures for light-scattering propagates like arcs with the light source being as the center of the arc, the plurality of micro-structures for light-scattering are arranged such that the longitudinal direction is substantially in parallel to a line which passes through the micro-structures for light-scattering and a light source closest to the micro-structures for light-scattering. This increases the light scattering efficiency, and an illumination device which provides bright light can be formed.

Further, by arranging the micro-structures for light-scattering such that longitudinal side surfaces thereof are substantially in parallel to the line which passes through the micro-structures for light-scattering and the light source, light reflected by the micro-structures for light-scattering can be scattered effectively. Further, by making higher the density of the formed micro-structures for light-scattering as the distance from the light source increases, it is made possible to evenly emit light from the light emitting surface of the light guide plate.

Further, by forming the shape in cross section of the micro-structures for light-scattering in the direction, which passes through the micro-structures for light-scattering and the light source, into a right triangle, light can be emitted efficiently.

Further, by forming the shape in cross section of the micro-structures for light-scattering in the direction, which passes through the micro-structures for light-scattering and a light source closest to the micro-structures for light-scattering, into an isosceles triangle, return light in the light guide plate can also be scattered with effect.

In addition, by providing a light diffusion sheet so as to oppose the light emitting surface of the light guide plate, visual angle characteristics of a liquid crystal display device using the present illumination device can be improved.

Further, by providing at least one prism sheet so as to oppose the light emitting surface of the light guide plate, the prism sheet having a plurality of prisms formed thereon, and the prisms having edge lines perpendicular to or in parallel to the light incident surface, it is made possible to emit light perpendicularly to the light emitting surface of the light guide plate, and thus, the visual angle characteristics can be improved.

Still further, by providing one prism sheet, a plurality of prisms thereof having edge lines perpendicular to a direction passing through the plurality of prisms and the light source, and by providing one prism sheet having a plurality of prisms formed thereon, the edge lines of the prisms on the latter prism sheet being perpendicular to or in parallel to the light incident surface, illumination with high directivity is made possible.

Further, by holding the above-described light source, light incident body, light guide plate, light diffusion sheet, prism sheet(s), or light reflecting layer by a casing having an opening on the side of the light emitting surface of the light guide plate, the illumination device can be handled with ease and can have stable characteristics.

Still further, with a structure where a passive type (non self light emitting type) display element is illuminated by the illumination device according to the present invention, a thin display device with high brightness can be realized.

BRIEF DESCRIPTION OF THE DRAWINGS

In the accompanying drawings:

FIG. 13 is sectional views schematically illustrating illumination devices according to the present invention;

FIG. 14 is a perspective view schematically illustrating an illumination device according to the present invention;

DETAILED DESCRIPTION OF THE PREFERRED EMBODIMENTS

Figure 1:
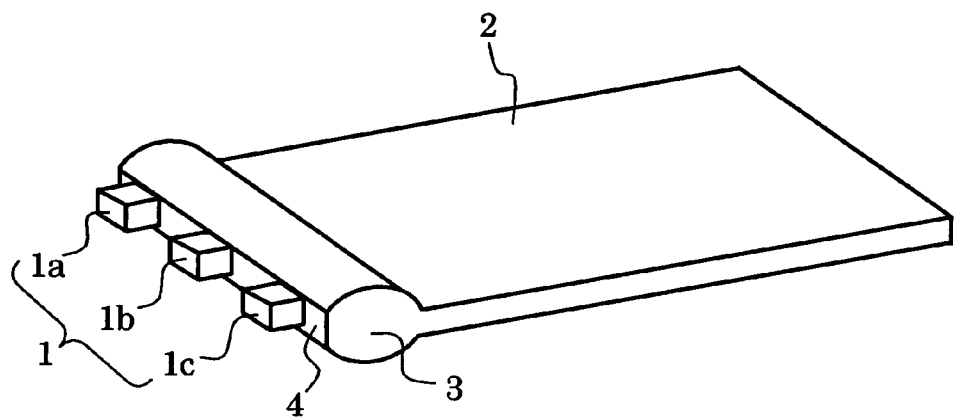
FIG. 1 is a perspective view schematically illustrating an illumination device according to the present invention.

An illumination device according to the present invention emits light which comes from a light source from a light emitting surface of a light guide plate. The illumination device according to the present invention includes a light incident body optically coupled to the light guide plate at one end portion thereof. A light incident surface on which light from the light source is incident is formed at the other end portion of the light incident body. Further, the light incident body has an oval portion in outer shape. With such a structure, optical coupling between the light source and the light guide plate the thickness of which is smaller than that of the light source can be carried out with a high efficiency. More specifically, incident light can propagate efficiently into the thin light guide plate without a considerable influence on the distribution of the angle of incidence with respect to the light guide plate.

Further, the light incident surface is formed to be located between an anterior focal point on the side of the light source in the oval portion and a center of the oval portion, and a coupling portion between the light incident body and the light guide plate is formed to be located near a posterior focal point.

Further, a light emitting surface of the light source is located between the anterior focal point and the light incident surface. That is, light emitted from the light source in the light incident body is substantially equivalent to light emitted from near the anterior focal point.

Further, a surface of the light guide plate on a side of the light emitting surface and a surface of the light guide plate on an opposing side are coupled to the oval portion by a pair of wedge-like planes having a tapered thickness from the light incident body towards the light guide plate. That is, the surfaces of the light guide plate are coupled to the oval portion by wedge-like planes. Further, end portions of the pair of wedge-like planes on the side of the light source are formed from locations near points of intersection between lines that pass through the posterior focal point and form a critical angle with the light guide plate and a surface of the oval portion. Further, a pair of light reflecting layers are provided to oppose the pair of wedge-like planes and a part of the light guide plate.

Further, a light reflector is provided between the light incident body and the light source, and an opening is provided for the light reflector at a position opposing the light incident surface. Herein, the opening provided in the light reflecting plate is set to have a size equal to or larger than that of the light emitting surface of the light source.

Alternatively, a rectangular portion is formed on the side of the light source of the light incident body is provided to continue to the oval portion, and the light incident surface is provided at the rectangular portion.

Further, a plurality of concave micro-structures for light-scattering having a longitudinal direction are formed on the surface of the light guide plate opposite to the light emitting surface into the light guide plate, and the plurality of micro-structures for light-scattering are arranged such that the longitudinal direction is substantially in parallel to a line which passes through the micro-structures for light-scattering and the light source. Further, the micro-structures for light-scattering are arranged such that longitudinal side surfaces thereof are substantially in parallel to the line which passes through the micro-structures for light-scattering and the light source. Further, the shape in cross section of the micro-structures for light-scattering in a direction perpendicular to the light incident surface and the light emitting surface of the light guide plate is made to be a right triangle. Alternatively, the shape in cross section of the micro-structures for light-scattering in a direction perpendicular to the light incident surface and the light emitting surface of the light guide plate is made to be an isosceles triangle.

Further, the illumination device according to the present invention includes a passive type display element and an illumination device having one of the above-described structures for illuminating the display element.

Embodiment 1

An illumination device according to the present invention is described in the following with reference to attached drawings. FIG. 1 is a perspective view schematically illustrating the illumination device according to the present invention. In FIG. 1, a light incident body 3 is coupled to a light guide plate 2 at an end portion. A light incident surface 4 is formed at the other end face of the light incident body 3 opposite to the side of the light guide plate 2. A plurality of light sources 1a, 1b, and 1c are arranged so as to oppose the light incident surface 4. The light incident body 3 and the light guide plate 2 are integrally formed as a one-piece structure by injection molding, and micro-structures for light-scattering (not shown) are formed on a surface of the light guide plate 2 which surface is opposite to a light emitting surface of the light guide plate 2. The light incident body 3 and the light guide plate 2 are not required to be integral in so far as the two are optically coupled to each other.

Light emitted from the light source 1 enters the light incident body 3 through the light incident surface 4, and after that, evenly propagates through the light guide plate 2. The light propagating in the light guide plate 2 is scattered by the micro-structures for light-scattering, emitted from the light emitting surface having no micro-structures for light-scattering formed thereon, and evenly illuminates an object to be illuminated (not shown). As illustrated in FIG. 1, a cross section of the light incident body 3 taken along a plane perpendicular to the light emitting surface and the light incident surface 4 is oval. More specifically, the light incident body 3 is formed such that the outside shape thereof is oval. Here, the light incident body 3 and the light guide plate 2 are formed of the same transparent polymer material. Such polymer materials include transparent polymer materials such as acrylic polymer materials, polycarbonate polymer materials, and cycloolefin polymer materials.

As the light source 1, an LED as a point-source light, a cold-cathode tube as a line-source light, or the like can be used. A plurality of (in FIG. 1, three) evenly spaced LEDs 1a, 1b, and 1c are arranged along a light incident portion of the light incident body. In the light incident portion, a portion opposing the light source is the light incident surface 4. Here, the light incident surface 4 is a plane perpendicular to the light emitting surface of the light guide plate, and its height is about the same as the size of a light emitting region of the light source 1. More specifically, it is preferable that the height of the light incident surface 4 is higher than about one half of the size of the light emitting region of the light source 1 and lower than about 1.2 times the size of the light emitting region. FIG.

1 illustrates an example where the light incident portion of the light incident body 3 is formed of a single plane including the light incident surface 4.

Figure 2:
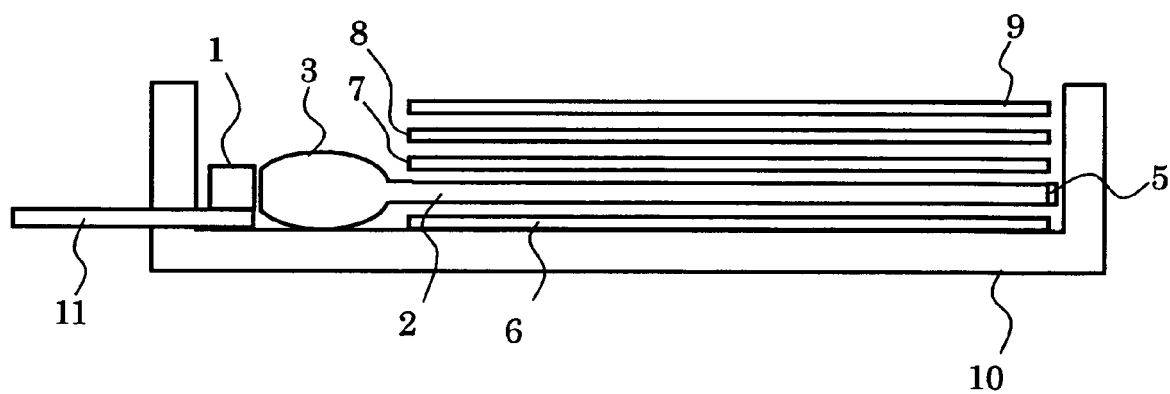
FIG. 2 is a sectional view schematically illustrating a structure of the illumination device according to the present invention.

FIG. 2 is a sectional view schematically illustrating an exemplary structure of the illumination device according to the present invention. As illustrated in FIG. 2, the light guide plate 2 is coupled to the light incident body 3, and the light source 1 is provided so as to oppose the light incident surface of the light incident body 3. An FPC board 11 for supporting the light source 1 and for supplying electric power thereto is coupled to the light source 1. A light diffusion sheet 7, a first prism sheet 8, and a second prism sheet 9 are stacked in this order on the side of the light emitting surface of the light guide plate 2. A light reflector 6 is provided so as to oppose a surface of the light guide plate 2 opposite to the light emitting surface (namely, the underside) Also, a light reflector 5 is provided on side surfaces of the light guide plate 2. A casing 10 holds these components to protect them from external forces and to make it easy to handle them.

The light diffusion sheet 7 has a minute uneven surface or has transparent beads of about 1 to 20 μm applied thereon via an adhesive in order to diffuse light and to evenly illuminate an object to be illuminated. The prism sheets are transparent sheets having a plurality of prisms formed thereon, the prisms having edge lines in parallel to a side of the sheets, and the prisms being formed toward the side of the light guide plate 2. The edge lines of the first prism sheet 8 are orthogonal to the edge lines of the second prism sheet 9. In other words, the edge lines of those prisms are formed to be perpendicular to or in parallel to the direction of arrangement of the light sources in the light incident surface. As the vertex angle of the formed prisms, about 90° is extensively used. By providing the prism sheets in this way, the direction of light components diagonally incident and perpendicular to the edge lines of the prisms can be changed to be vertical to improve the efficiency of illumination. In many cases, light emitted from the light guide plate 2 has directivity in a particular direction. Accordingly, as illustrated in FIG. 2, by using the two prism sheets the edge lines of which are orthogonal to each other, light in all directions emitted diagonally from the light guide plate 2 can be illuminated perpendicularly to an object to be illuminated.

Of course, depending on the shape of the micro-structures for light-scattering formed on the underside of the light guide plate 2, light from the light guide plate 2 can be emitted vertically. In this case, either the first prism sheet 8 or the second prism sheet 9 illustrated in FIG. 2 is unnecessary. There is also a case where those prism sheets are not necessary at all.

The light reflector 6 reflects light which leaks from the underside of the light guide plate 2 to emit the light on the side of an object to be illuminated or to reuse the light inside the light guide plate 2. As the light reflector 6, one having a light reflecting layer formed on a film by vapor deposition of Al, Ag, or a compound of Ag and Pd, one having a white pigment with a high reflectance dispersed in a polymer film, or the like can be used. Further, a transparent polymer sheet having multiple minute air bubbles formed therein to increase the reflectance may also be used. It is to be noted that, when, as the material for forming the casing 10, one having a white pigment with a high reflectance dispersed in a polymer film is used, since the casing 10 itself has a function similar to that of the light reflector 6, the light reflector 6 may be omitted.

The light reflector 5 is formed on three side surfaces of the light guide plate 2, and returns light which leaks to the side surfaces from the inside of the light guide plate 2 to the inside of the light guide plate 2 to be reused. Since the light guide plate 2 used in the illumination device according to the present invention is at least as thin as 0.7 mm or thinner, and typically as thin as about 0.2 to 0.4 mm, in order to efficiently return light which leaks from the side surfaces of the light guide plate 2, it is necessary to provide the light reflector 5 adjacent to the side surfaces of the light guide plate 2. In the example illustrated in FIG. 2, the light reflector 5 is formed by vapor deposition of Al, Ag, or a compound of Ag and Pd on a film. Of course, a white pigment with a high reflectance may be directly applied to the side surfaces of the light guide plate 2, or, a sheet with a high reflectance such as the light reflector 6 may be affixed.

Figure 3:
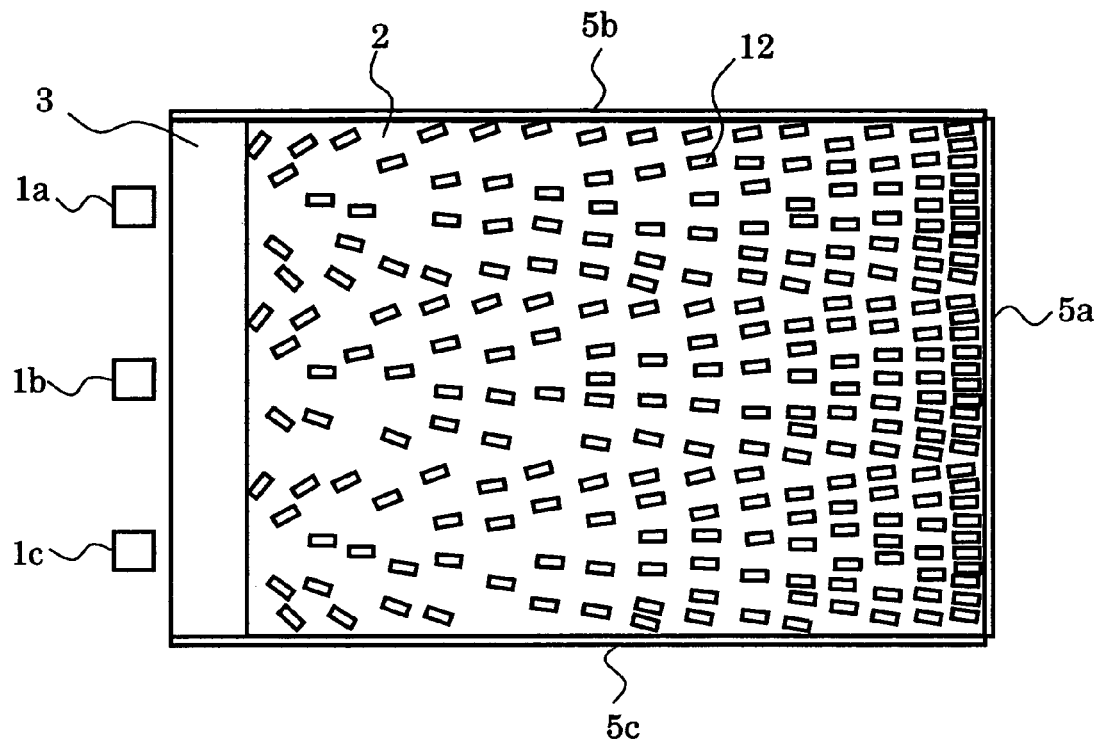
FIG. 3 is a plan view schematically illustrating the illumination device according to the present invention.

FIG. 3 is a plan view seen from the bottom of the illumination device according to the present invention, and schematically illustrates the arrangement of the micro-structures for light-scattering formed on the underside of the light guide plate 2. In FIG. 3, the three LEDs 1a, 1b, and 1c are arranged as the light source. The micro-structures 12 for light-scattering are arranged such that their longitudinal direction is substantially in parallel to a line which passes through each micro-structure for light-scattering and a light source closest to each micro-structure for light-scattering.

Since the longitudinal direction of the shape of the micro-structures 12 for light-scattering is arranged substantially in parallel to a line which passes through the shape and an LED, packing density can be made high of the microstructures 12 for light-scattering along arcs the center of which is near an LED, and, as a result, the scattering characteristics are difficult to saturate. Further, since the optical power density in the light guide plate 2 decreases as the distance from the LEDs increases, the micro-structures 12 for light-scattering are formed such that the density of the formed micro-structures 12 becomes higher as the distance from the LEDs increases, and thus, the amount of light emitted from the light guide plate 2 can be made even over the whole light emitting surface of the light guide plate 2. By arranging the micro-structures 12 for light-scattering as randomly as possible, moire and the like can be suppressed.

Further, since, compared with the thickness of a light guide plate conventionally used in an illumination device, that is, 0.6 to 0.7 mm, the light guide plate used in the illumination device according to the present invention is thinner by about 15 to 75%, the number of reflections of light propagating in the light guide plate becomes larger in proportion thereto. Therefore, the density of the formed micro-structures for light-scattering can be lower than that of micro-structures for light-scattering in a conventional light guide plate by about 15 to 75%. As a result, it is possible to eliminate saturation of the scattering characteristics in the light guide plate 2, the efficiency of reflecting light by the micro-structures for light-scattering is improved, and manufacture of the micro-structures for light-scattering becomes easier.

Further, as illustrated in FIG. 3, light reflectors 5a, 5b, and 5c are provided on side surfaces of the light guide plate 2. The places where the light reflectors are formed are not limited to side surfaces of the light guide plate 2. By providing them on side surfaces of the light incident body 3, light which leaks from the side surfaces of the light incident body 3 can be returned to the inside of the light guide plate 2 to be reused, and thus, the efficiency of utilizing light can be improved. The length of the light incident body 3 in a direction perpendicular to the light incident surface is required to be long enough for the optical density in a direction parallel to the light incident surface to be even at the coupling portion between the light incident body 3 and the light guide plate 2. This length is about the same as the length of an ineffective region on the side of the light source of a light guide plate conventionally used in an illumination device, and is about 3 to 7 mm.

Figure 4:
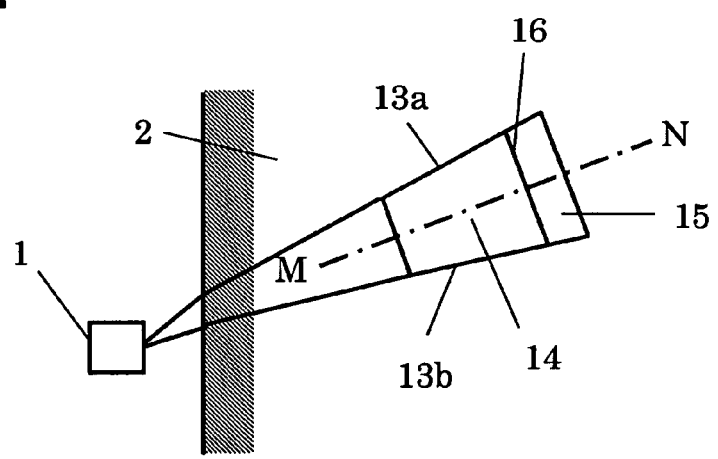
FIG. 4 is a partial plan view illustrating a micro-structure for light-scattering of the illumination device according to the present invention.

FIG. 4 is a schematic plan view illustrating in further detail the shape of a micro-structure for light-scattering formed on the underside of the light guide plate. The micro-structures for light-scattering formed on the underside of the light guide plate are concave into the light guide plate, and, seen from the underside, they have longitudinal directivity. The micro-structure for light-scattering is composed of two inclined surfaces 14 and 15 intersecting in an edge line 16, and two side surfaces 13a and 13b substantially perpendicular to the light emitting surface. The inclined surface 14, which is inclined toward a point-source light in FIG. 4, has an area larger than that of the other inclined surface 15. An imaginary plane MN which includes a median of the inclined surface 14 and also includes a normal from a point on the median to the light emitting surface of the light guide plate is substantially in parallel to a line which passes through the median and the light source 1. When there are a plurality of light sources, the imaginary plane is substantially in parallel to a line which passes through the median and the closest one among the light sources. Further, an imaginary plane which includes the side surface 13a and an imaginary plane which includes the side surface 13b form an angle such that they intersect near the light source 1. When there are a plurality of point-source lights, the imaginary planes which includes the side surfaces of the micro-structure for light-scattering, respectively, intersect near the closest light source among the light sources. By using the micro-structure for light-scattering shaped in such a way, the density of reflected light on the plane 14 can be made even in a direction perpendicular to the line which passes through the micro-structure for light-scattering and the light source irrespective of the distance, and thus, brightness caused by the micro-structure for light-scattering can be maximized.

Figure 5:
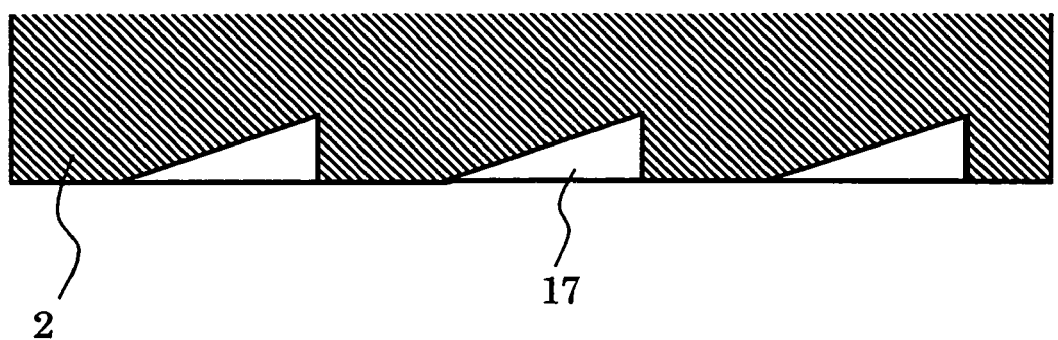
FIG. 5 is a sectional view schematically illustrating a shape of the micro-structures for light-scattering according to the present invention.

FIG. 5 is a sectional view of explanatory micro-structures for light-scattering taken along the imaginary plane MN indicated by alternate long and short dashed lines in FIG. 4. The explanatory micro-structures 17 for light-scattering are substantially right triangles in shape in cross section taken along a plane which passes through the micro-structures 17 for light-scattering and a closest light source among a plurality of light sources. The substantially right triangles mean that the inclined surface 15 illustrated in FIG. 4 is substantially perpendicular to the underside of the light guide plate 2. The angle which the inclined surface 14 forms with the underside of the light guide plate 2 is in the range of 5 to 45 degrees, depending on the thickness of the length of the light guide plate, the angle of light emitted from the light emitting surface, and the like. When the angle is as small as about 5 to 15 degrees, since light propagating through the light guide plate can be totally or almost totally reflected, the efficiency of emitting light becomes higher, but, since the angle of emitted light greatly deviates from the normal to the light emitting surface of the light guide plate, the visual angle characteristics are deteriorated. In that case, it is necessary to correct the angle of emitted light with the prism sheet illustrated in FIG. 2.

Figure 6:
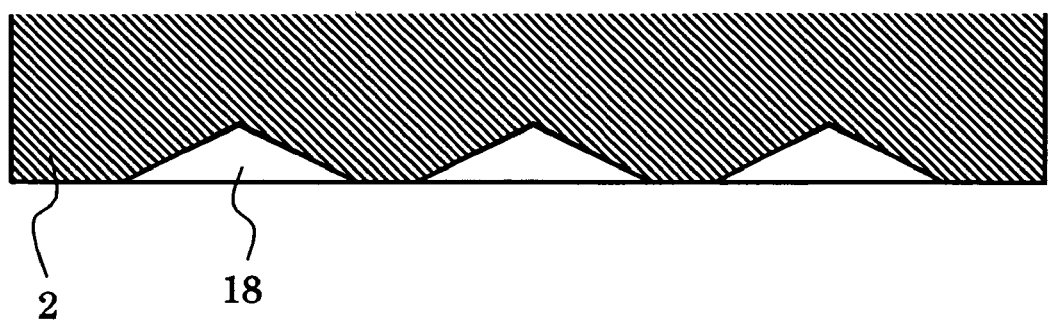
FIG. 6 is a sectional view schematically illustrating another shape of the micro-structures for light-scattering according to the present invention.

FIG. 6 illustrates another shape in cross section of the micro-structures for light-scattering according to the present invention. The shape in cross section is also taken along the alternate long and short dashed lines MN in FIG. 4. The shape in cross section of the micro-structures 18 for light-scattering illustrated in FIG. 6 is an isosceles triangle. By making the shape in cross section the isosceles triangle, return light from an end face which opposes the light incident surface where the light source is provided can be efficiently reflected and deflected to the side of the light emitting surface.

The micro-structures for light-scattering illustrated in FIGS. 5 and 6 typically has a base of 10 to 50 μm×20 to 120 μm and a height of 3 to 120 μm, although they vary depending on the shape in cross section, the inclination of the inclined surfaces, and the like. When it is required to make the density as high as possible, the short side of the base is set to be a value as small as about 10 μm.

When the micro-structures for light-scattering illustrated in FIGS. 5 and 6 are arranged such that their longitudinal direction is substantially in parallel to a line which passes through themselves and the closest light source as illustrated in FIG. 3, by using either the first prism sheet 8 or the second prism 9 illustrated in FIG. 2 arranged such that the edge lines of the prisms formed on the surface thereof are substantially perpendicular to a line which passes through the light source and the micro-structures for light-scattering, light emitted from the light guide plate 2 can be vertically emitted with efficiency. This is because, by using such a prism sheet, light emitted from the light guide plate is deflected by the prisms only with regard to the direction of emission from the light guide plate.

Figure 8:
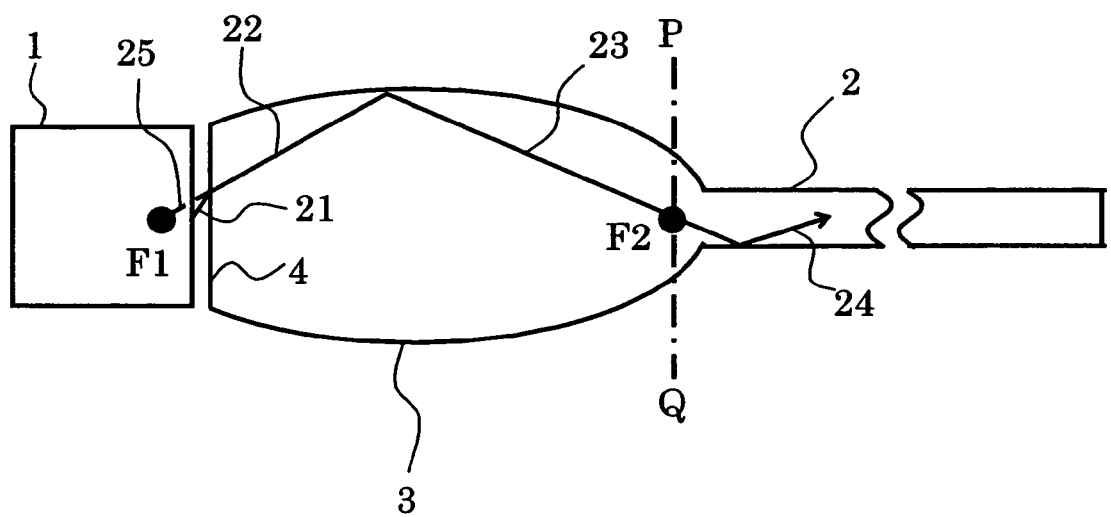
FIG. 8 is a partial sectional view schematically illustrating an illumination device according to the present invention.

Next, behavior of light adjacent the light incident body forming the illumination device according to the present invention is described in further detail. FIG. 8 is an enlarged side sectional view schematically illustrating the vicinity of the light incident body according to the present invention. As illustrated in FIG. 8, the upper and lower surfaces (the surface on the side of the light emitting surface of the light guide plate and the opposing surface) of the light incident body 3 are, when viewed together, oval in shape in cross section. The light incident surface 4 formed of a flat surface is formed on the side of the light source 1, while the opposite side is coupled to the light guide plate 2. Though it is preferable that the light incident body 3 and the light guide plate 2 are formed of the same material and integrally coupled to each other, such as by forming the two as a one-piece molded structure, all that is necessary is that the two are optically coupled to each other such that light is not reflected to a large extent at the coupling portion therebetween. More specifically, the light incident body 3 and the light guide plate 2 may be integrally coupled to each other by an optical adhesive so that no intervening air space exists between the light incident body and the light guide plate, or the light incident body 3 and the light guide plate 2 may be provided in close proximity to each other.

The size of the light incident surface 4 is almost similar to that of the light source 1. If the light incident surface 4 is smaller than the light source 1, the amount of light which leaks out increases, while, if the light incident surface 4 is substantially larger than the light source, the light incident body becomes thicker, which is not preferable in view of the object of making a thinner illumination device. Even in cases where the light incident body 3 cannot be made satisfactorily thick, it is preferable that the light incident surface is at least half the height of a light emitting surface of the light source 1.

The light incident body 3 which is oval in cross section has two focal points F1 and F2. The focal point F1 on the side of the light source 1 is referred to as an anterior focal point while the other focal point F2 is referred to as a posterior focal point. The light incident surface 4 is located between the anterior focal point F1 and the center of the oval, and the light emitting surface of the light source 1 is located on the side of the posterior focal point F2 with respect to the anterior focal point F1. Therefore, light 21 emitted from the center of the light emitting surface of the light source 1 is refracted by the light incident surface 4 to enter the light incident body 3 as indicated by a light beam 22. An extension 25 of the light beam 22 on the side of the light source 1 reaches the anterior focal point F1. In other words, it is preferable to provide the light emitting surface of the light source 1 such that the light beam 22 propagates in the light incident body as if the light beam 22 were emitted from the anterior focal point F1.

In FIG. 8, an imaginary plane PQ passes through the posterior focal point F2 and is in parallel to the light incident surface 4. The coupling portion between the light incident body 3 and the light guide plate 2 is formed near a line of intersection of the imaginary plane PQ and the oval surface of the light incident body 3. This can make the light guide plate 2 satisfactorily thinner than the light source 1. If the coupling portion comes closer to the side of the light source 1, for example, near the center of the oval, the light guide plate 2 has to be as thick as a conventional light guide plate.

Figure 7:
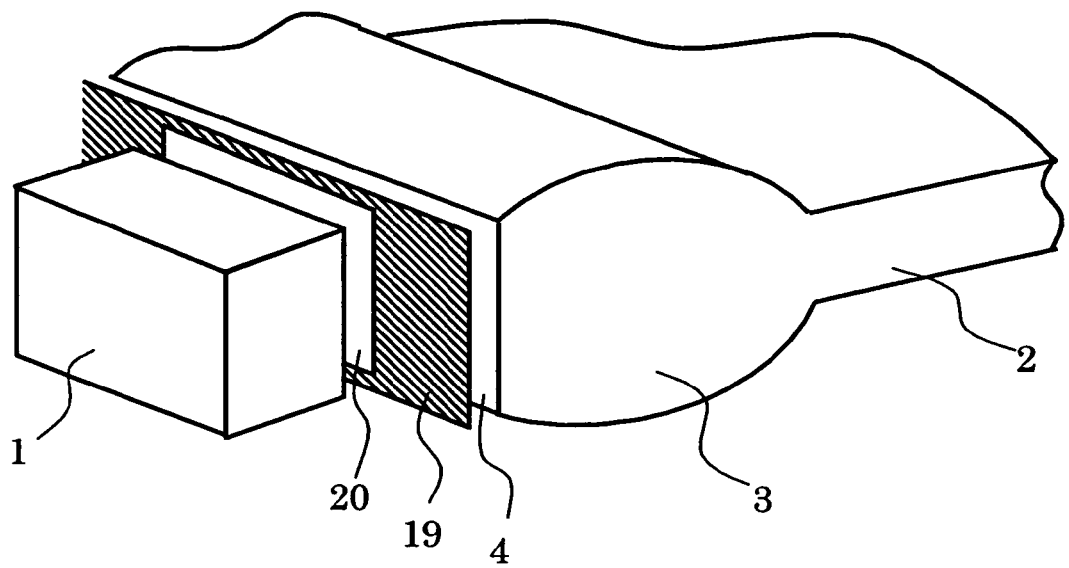
FIG. 7 is a partial perspective view schematically illustrating the illumination device according to the present invention.

Generally, light which passes through one of the focal points is reflected by the oval surface and passes through the other focal point. Therefore, in the structure described in the above, light emitted from the center of the light emitting surface of the light source 1 passes through the posterior focal point F2 as indicated by a light beam 23, and efficiently enters the light guide plate 2 as indicated by a light beam 24. Similarly, light emitted from near the center of the light emitting surface of the light source 1 passes near the posterior focal point F2, and efficiently enters the light guide plate 2. Nevertheless, light, which passes through the posterior focal point F2 and does not enter the light guide plate 2, slightly exists. This light is reflected by the oval surface of the light incident body 3 and back toward the light incident surface 4. In order to turn this light to the light guide plate 2, a light reflector is provided between the light incident surface 4 and the light source 1. FIG. 7 shows this structure. As illustrated in FIG. 7, a light reflecting plate 19 provides a light transmission portion 20 at a position opposing the light source 1. Herein, the light transmission portion 20 such as an opening is set to have a size equal to or larger than that of the light emitting surface of the light source 1.

Figure 9:
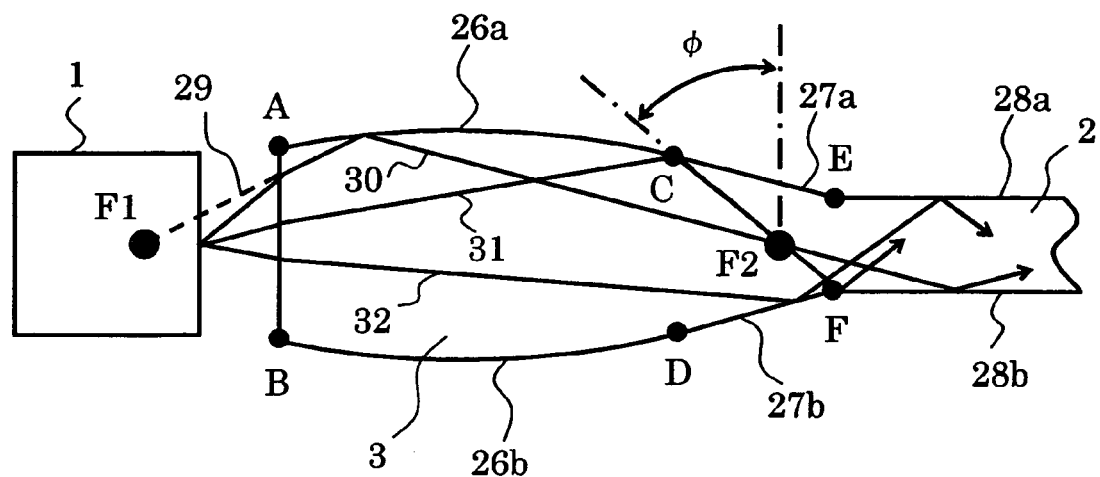
FIG. 9 is a partial sectional view schematically illustrating an illumination device according to the present invention.

Next, FIG. 9 is an enlarged side sectional view of another light incident body used in the illumination device according to the present invention. The embodiment illustrated in FIG. 9 differs from that illustrated in FIG. 8 in that the coupling portion between the light incident body 3 and the light guide plate 2 has wedge-like planes. In FIG. 9, among surfaces forming the light incident body 3, surfaces 26a (AC) and 26b (BD) are a part of an oval, while planar surfaces 27a (CE) and 27b (DF) are planes and are coupled to the light guide plate 2 at points E and F, respectively. The planes or planar surfaces CE and DF constitute a wedge having a tapered thickness that decreases from the light incident body 3 towards the light guide plate 2. A light incident surface AB is a plane perpendicular to the light emitting surface of the light guide plate 2.

Next, points C and D where the widge-like planes 27a and 27b intersect the oval surface are described. First, in FIG. 9, an arbitrary line which passes the posterior focal point F2 and a line which passes through F2 and is perpendicular to the light emitting surface form an angle $\phi$ as illustrated in FIG. 9. Points of intersection of the arbitrary line and the oval surface when $\phi$ is the critical angle of the light guide plate 2 are selected to be points C and D, respectively. The wedge-like planes are between points C and D selected in this way. When the wedge-like planes touch a part of oval AC and BD, respectively, or the wedge-like planes and the light guide plate form a smaller angle, junction loss is small.

The light incident surface AB is on the side of the light guide plate 2 with respect to the anterior focal point F1, and the height AB is similar to that of the light source 1. Light emitted from the center of the light emitting surface of the light source 1 propagates as if it were emitted from or from the vicinity of the anterior focal point F1, when seen from the inside of the light incident body. In fact, light emitted from the center of the light emitting surface of the light source 1 looks as if it were emitted from a region having a particular range near F1 when seen from the inside of the light incident body 3. In other words, the light source 1 is arranged such that a light beam in the light incident body 3 looks as if it were emitted from near the center of the particular range.

With reference to FIG. 9, a case is described where light from the light source 1 is reflected by a part of the oval AC or BD as indicated by a light beam 30. Here, in the light incident body 3, a light beam 30 looks as if it were emitted from near the anterior focal point F1 as indicated by a broken line 29 in FIG. 9. Accordingly, the light beam 30 is reflected by a part of the oval AC so as to pass near the posterior focal point F2 and enters the light guide plate 2. Since light which enters the light guide plate 2 and the light emitting surface of the light guide plate 2 or the underside thereof form an angle which is equal to or greater than the critical angle, the light propagates through the light guide plate 2 repeating total reflection.

On the other hand, a light beam 31 incident on a boundary between the wedge-like plane CE and a part of the oval AC passes through the posterior focal point F2, and after that, enters the light guide plate 2 forming the critical angle. Therefore, the light is totally reflected and propagates through the light guide plate 2.

Further, a light beam 32 which is incident on the wedge-like plane DF is reflected, and after that, enters the light guide plate 2 without passing through the posterior focal point F2. Since the light beam enters the light guide plate 2 with a larger angle of incidence than that of the light beam 31, the light beam forms an angle which is equal to or greater than the critical angle in the light guide plate 2, and therefore, the light propagates through the light guide plate 2 repeating total reflection.

In this way, in the structure illustrated in FIG. 9, even if the light guide plate 2 is thinner than the light source 1, light which enters the light incident body 2 propagates through the light guide plate 2 with the critical angle being retained. However, since, in fact, the light source 1 is not a point-source light and the light emitting surface has a finite size, light is not guided into the light guide plate in the above-described ideal state corresponding to a point-source light. However, since light propagating through the light incident body as if it were emitted from near the anterior focal point F1 passes near the posterior focal point F2 without fail, most light enters the light guide plate retaining an angle of incidence which is equal to or larger than the critical angle.

Figure 11:
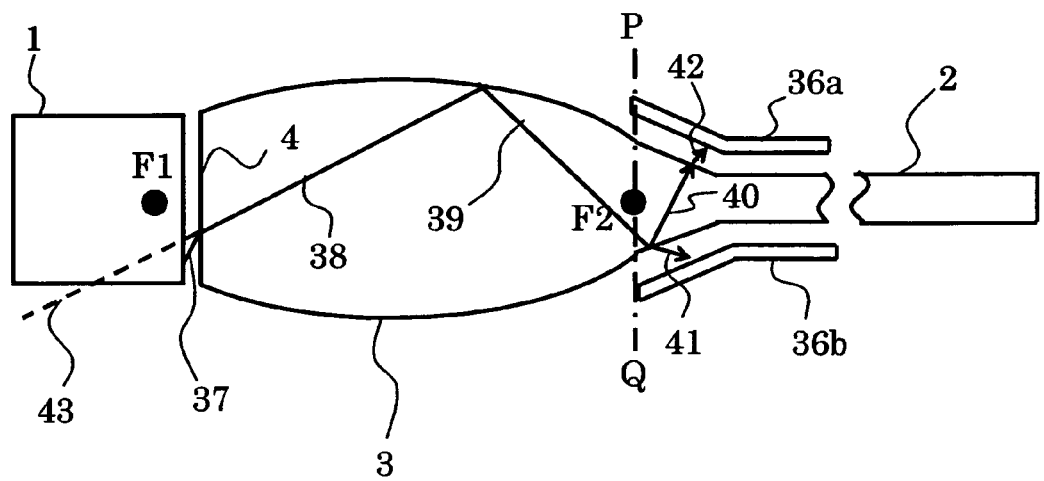
FIG. 11 is a partial sectional view schematically illustrating an illumination device according to the present invention.

On the other hand, light emitted from a position which is far from the center of the light emitting surface of the light source 1 is far from the posterior focal point F2 of the light incident body 3, and leaks to the outside from the coupling portion between the light incident body 3 and the light guide plate 2, an example of which is illustrated in FIG. 11. In FIG. 11, a light beam 37 emitted from and end portion of the light emitting surface of the light source 1 is refracted by the light incident surface 4 to enter the light incident body 3. Here, an extension 43 of a light beam 38 which enters the light incident body 3 is far from the anterior focal point F1. Therefore, light reflected by the surface of the light incident body which is oval in cross section passes through a region on the side of the light source with respect to the posterior focal point F2, and enters the wedge-like plane which is the coupling portion between the light guide plate 2 and the light incident body 3, as indicated by a light beam 39. As a result, the angle of incidence of the light with respect to the wedge-like plane is smaller than the critical angle, and as indicated by a light beam 41, a part of the light is transmitted through the wedge-like plane as indicated by a light beam 41. Further, since the light reflected by the wedge-like plane is, as indicated by a light beam 40, reflected with the angle of incidence being closer to the direction perpendicular to the light emitting surface of the light guide plate 2, part of the reflected light is also transmitted through the other wedge-like plane to the outside as indicated by a light beam 42. When light transmitted to the outside mixes with the illuminating light at the coupling portion between the light guide plate 2 and the light incident body 3, uneven brightness and a bright line are caused, and in addition, the efficiency of utilizing light is lowered.

In the embodiment illustrated in FIG. 11, in order to prevent the leakage light described in the above and, at the same time, to return it to the inside of the light guide plate to be reused, light reflectors 36*a* and 36*b* are provided in proximity to the coupling portion between the light guide plate 2 and the light incident body 3. The light reflectors are provided in proximity to the light emitting surface and the underside of the light guide plate 2, respectively. An imaginary plane PQ passes through the posterior focal point F2 and is in parallel to the light incident surface 4. The amount of light which leaks to the outside from the coupling portion between the light guide plate 2 and the light incident body 3 drastically increases in a region on the side of the light guide plate 2 with the imaginary plane PQ being the boundary. Accordingly, the light reflectors 36*a* and 36*b* are provided so as to cover at least the side of the light guide plate with respect to the imaginary plane PQ. Further, as for the ends of the light reflectors 36*a* and 36*b* on the side of the light guide plate, it is sufficient that they are a little backward from the starting point of the light guide plate 2 at the coupling portion, the distance between the ends of the light reflectors and the starting point of the light guide plate being about one to three times as much as the thickness of the light guide plate 2.

Although, in FIG. 11, the light reflectors 36*a* and 36*b* are V-shaped such that the space between the light reflectors and the surfaces of the light incident body and of the light guide plate is constant, the light reflectors may be flat. Further, although the case where there is a gap between the light reflectors 36*a* and 36*b* is illustrated, the light reflectors 36*a* and 36*b* may be coupled using a double-faced tape, an adhesive, or the like. Further, Al, Ag, an alloy of Ag and Pd, or the like may be vacuum deposited on the coupling portion between the light incident body and the light guide plate through a fixed mask, or, a dielectric multilayer light reflector may be formed on the coupling portion.

As the light reflectors, a metal plate with a high reflectance may be used as it is, or, a polymer film having a metal mirror or a dielectric multilayer mirror formed thereon may be used.

The amount of leakage light at the coupling portion between the light incident body and the light guide plate described in the above becomes greater as the ellipticity of the oval surface of the light incident body becomes smaller, and as the size of the light emitting surface of the light source becomes larger. In particular, when the ratio of the major axis to the minor axis of the oval surface of the light incident body is about 5 or smaller, it is preferable that the light reflectors 36*a* and 36*b* cover a region which goes beyond the plane PQ in FIG. 11 to the side of the light source.

Figure 10:
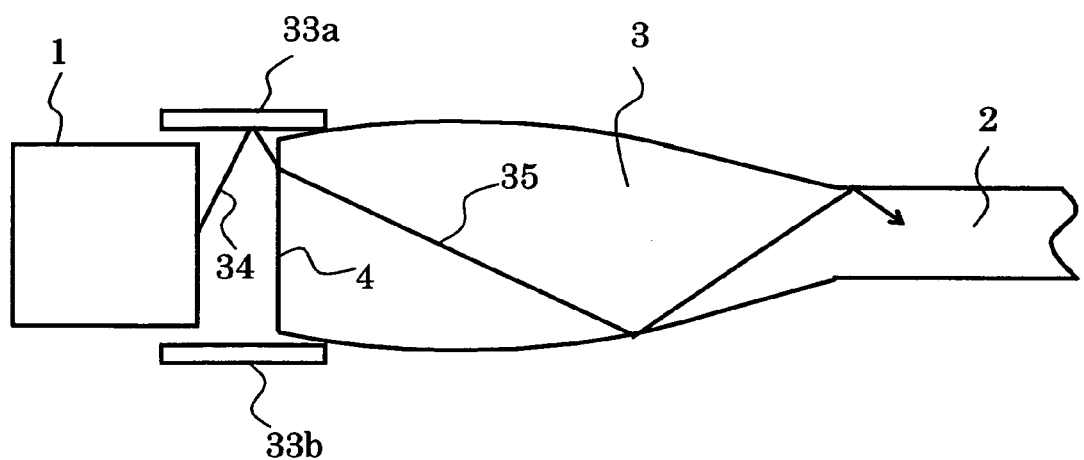
FIG. 10 is a partial sectional view schematically illustrating an illumination device according to the present invention.

On the other hand, if the ellipticity of the oval in cross section forming a part of light incident body becomes greater, the amount of leakage light at the coupling portion between the light incident body 3 and the light guide plate 2 described with reference to FIG. 11 decreases. However, in that case, as illustrated in FIG. 10, the distance between the light source 1 and the light incident surface 4 increases, and therefore, light leaks from the gap between the light source 1 and the light incident surface 4, and the loss becomes greater. In order to solve this problem, in FIG. 10, a region surrounding the gap between the light source 1 and the light incident body 3 is covered with light reflectors 33*a* and 33*b*. In the embodiment illustrated in FIG. 10, light emitted from the light source 1 tries to leak from the gap between the light source 1 and the light incident body 3 as indicated by a light beam 34. However, the light beam is reflected by the light reflector 33*a*, enters the light incident body 3 through the light incident surface 4, and, as indicated by a light beam 35, propagates to the light guide plate 2 to be able to contribute to illumination. Though, in FIG. 10, only the two reflectors 33*a* and 33*b* are illustrated, but it goes without saying that light reflectors are also provided on the side of the side surfaces which are parallel to the plane of the drawing. As the light reflectors 33*a* and 33*b*, similar ones to the light reflectors 36*a* and 36*b* in FIG. 11 can be used.

Figure 12:
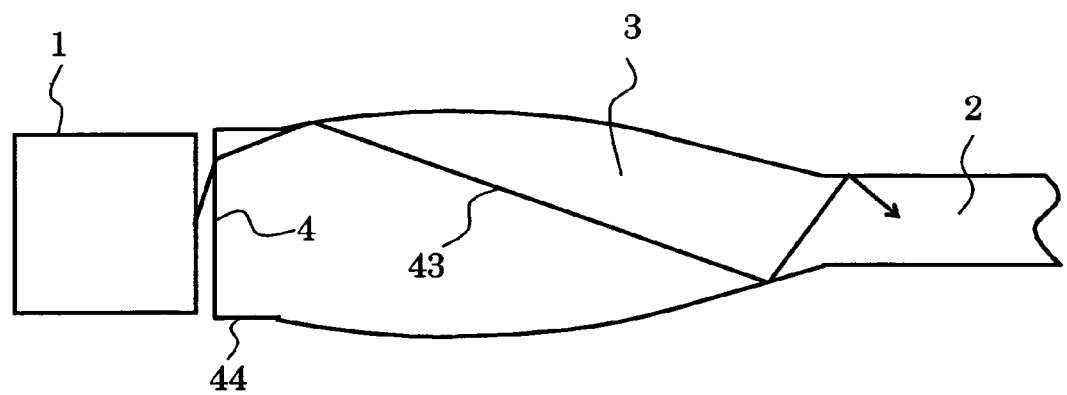
FIG. 12 is a partial sectional view schematically illustrating an illumination device according to the present invention.

FIG. 12 illustrates another embodiment of the illumination device according to the present invention, where a rectangular light incident portion 44 is formed on the side of the light source 1 of the light incident body 3. The rectangular light incident portion 44 is coupled smoothly to the light incident body 3 without an optical boundary, and a surface of the rectangular light incident portion 44 which opposes the light source 1 is the light incident surface 4. The structure illustrated in FIG. 12 allows arrangement of the light incident surface 4 in proximity to the light source 1, and thus, as indicated by a light beam 43, light from the light source 1 can propagate efficiently into the light guide-plate 2 with minimum leakage light to the outside from the gap between the light source 1 and the rectangular light incident portion 44.

Next, FIG. 13 is enlarged side sectional views of other light incident bodies of the illumination device according to the present invention. In FIG. 13A, a top of the oval forming the light incident body 3 is flush with the light emitting surface of the light guide plate 2. The structure illustrated in FIG. 13A allows light repeatedly reflected in the light incident body 3 to propagate efficiently into the light guide plate 2. Further, since a part of the light incident body 3 is flush with the light emitting surface of the light guide plate 2 in the structure, workability in incorporation into the illumination device illustrated in FIG. 2 is improved.

FIG. 13B illustrates a structure where the rectangular light incident portion 44 is formed on the side of the light source 1 of the light incident body 3. FIG. 13C illustrates a structure where a part of the oval forming the light incident body 3 is cut off by an extension of the light emitting surface of the light guide plate 2 such that a top face of the light incident body and a top face of the light guide plate are flush with each other. In this case, also, a top of the light incident body 3 is flush with the light emitting surface of the light guide plate 2. FIG. 13D illustrates a structure where a wedge-like plane is formed at the coupling portion between the light incident body 3 and the light guide plate 2 such that the light incident body 3 and the light guide plate 2 are smoothly coupled to each other. More specifically, as illustrated in the figure, an oval portion of the light incident body and the light guide plate are coupled to each other by the wedge-like plane such that the distance between the light emitting surface and the opposing surface of the light guide plate decreases linearly in a direction away from the light incident body. It goes without saying that effects of what are illustrated in FIGS. 13B to 13D are similar to those of what is illustrated in FIG. 13A. FIG. 13E illustrates a structure where the longitudinal direction of the light incident body 3 and the light guide plate 2 are not in parallel but form an angle. With this structure, even when the light source 1 and the light guide plate 2 are at different levels, light emitted from the light source 1 is repeatedly reflected in the light incident body 3 and propagates efficiently into the light guide plate 2.

FIG. 14 is a perspective view of the embodiment illustrated in FIG. 13D. Light reflectors 36a and 36b are formed above and below the light guide plate 2 with a certain gap between themselves and the opposing surfaces of the light guide plate 2, respectively. In this case, also, the light reflectors 33a and 33b illustrated in FIG. 10 may be formed.

Figure 15:
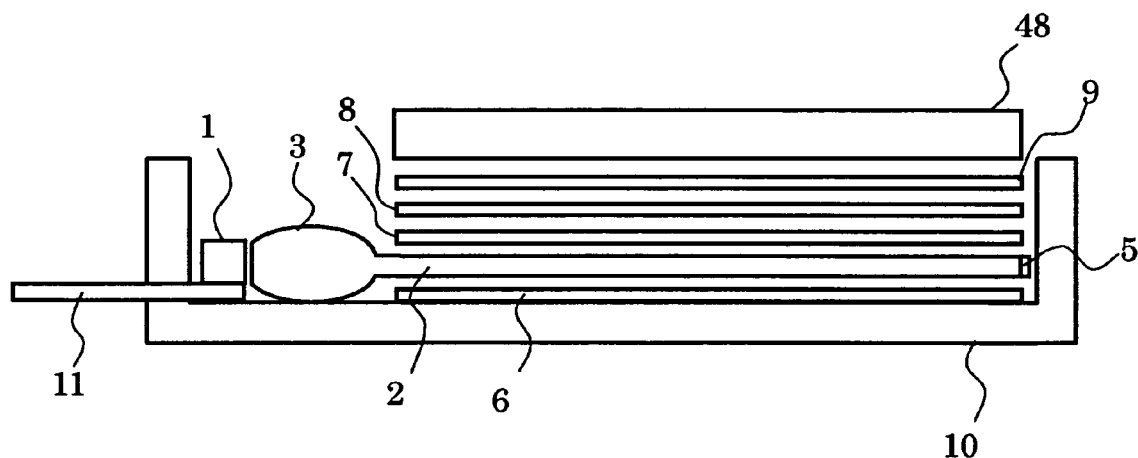
FIG. 15 is a sectional view schematically illustrating a structure of an illumination device according to the present invention.

Here, an application of the illumination device according to the present invention is described. FIG. 15 is a schematic sectional view of the structure of a liquid crystal display device using the illumination device according to the present invention. In FIG. 15, components denoted by reference numerals 1 to 11 are similar to those shown in FIG. 2 and are components of the illumination device according to the present invention. Here, a liquid crystal display device 48 is provided at the uppermost surface above the light emitting surface of the illumination device. As the liquid crystal display device, for example, a TFT liquid crystal display device or a passive matrix liquid crystal display device using TN liquid crystal, STN liquid crystal, or the like can be used. The liquid crystal display device 48 is held in common with the illumination device by the casing 10. An FPC board (not shown) is attached to the liquid crystal device 48, and is supplied with power and a drive signal from a liquid crystal drive circuit. The structure illustrated in FIG. 15 can attain a bright liquid crystal display device which is thin and with even brightness.

The illumination device according to the present invention is now specifically described with reference to the drawings.

SPECIFIC EXAMPLE 1

As shown in FIG. 1, three white LEDs as the light source were arranged along the light incident surface to make the illumination device according to the present invention. The height of the light emitting surfaces of the white LEDs was 0.5 mm. The light guide plate having a size of 35 mm in width and 40 mm in length was used. The ratio of the major axis to the minor axis of the oval surface of the light incident body was 6.7. The distance between the light incident surface and the light emitting surface of the white LEDs was about 0.7 mm, and the light incident surface was 0.5 mm in height. Further, a polymer tape with an Al film vapor deposited on a surface on the side of the light guide plate thereof was attached on the surfaces on the side of the light guide plate and of the light incident body except the surface of the light guide plate opposing the light incident surface.

First, as illustrated in FIG. 8, a sample was prepared where the light guide plate and the light incident body were directly coupled (Sample 1). In Sample 1, a location of the coupling portion between the light incident body and the light guide plate differs depending on the thickness of the light guide plate, but was approximately near the posterior focal point. In order see how the efficiency of light propagation changes according to the thickness of the light guide plate, light guide plates which were 100 μm, 200 μm, 300 μm, 400 μm, 500 μm, 600 μm, and 700 μm in thickness were prepared.

Next, as illustrated in FIG. 11, a sample was prepared (Sample 2). In Sample 2, the light incident body and the light guide plate were coupled at the coupling portion, and the coupling portions began where the imaginary plane PQ which passed through the posterior focal point and was in parallel to the light incident surface intersected the oval surface, and had a plane which was a tangent plane of the oval surface. The angle formed by the tangent plane and the light emitting surface of the light guide plate was about 20°. It is to be noted that, in Sample 2, the light reflectors 36a and 36b illustrated in FIG. 11 were not formed. In Sample 2, light guide plates which were 100 μm, 200 μm, 300 μm, and 400 μm thickness were prepared and the efficiency of light propagation was measured. As for cases where the thickness of the light guide plate was 400 μm or more, the wedge-like plane could not be formed between the light incident body and the light guide plate.

Further, the illumination device according to the present invention illustrated in FIG. 9 was prepared (Sample 3). In Sample 3, as illustrated in FIG. 10, reflectors were formed between the light source 1 and the light incident body 3. As a specific example of the light reflectors provided between the white LEDs and the light incident surface, mirror-finished Al plates were bent and processed to be used. In Sample 3, light guide plates which were 100 μm, 200 μm, 300 μm, 400 μm, and 500 μm thickness were prepared. As for cases where the thickness of the light guide plate was 500 μm or more, the wedge-like plane could not be formed.

Figure 16:
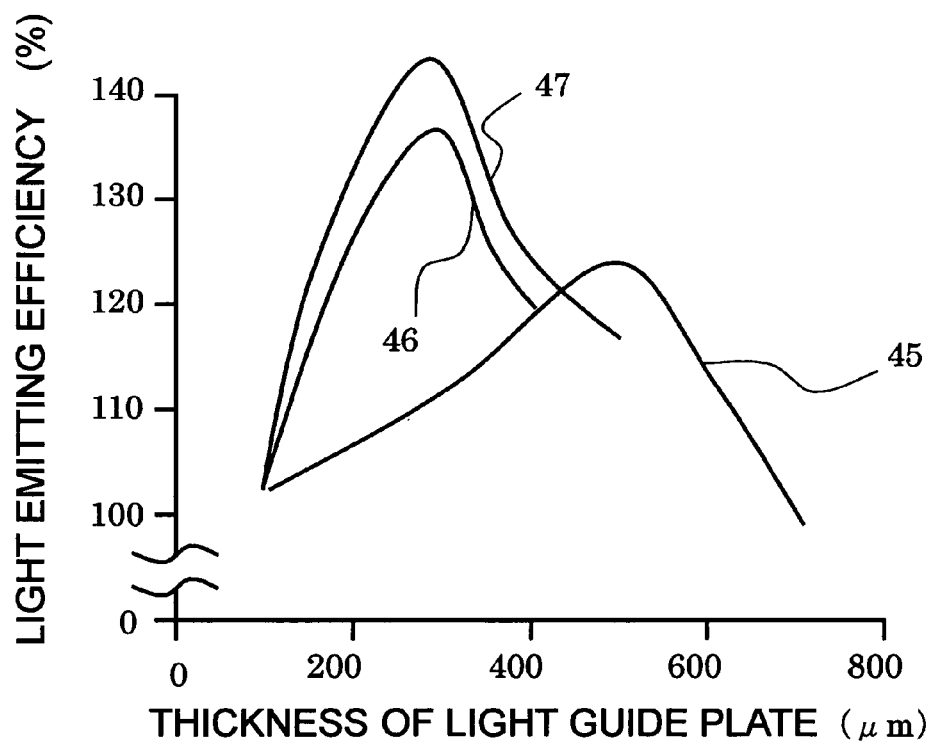
FIG. 16 is a graph illustrating specific light emitting efficiency of illumination devices according to the present invention.

With regard to the Samples 1, 2, and 3 prepared as described in the above, the total amount of light emitted from a surface opposing the light incident surface of the light guide plate was measured. Comparison was made with the total amount of light emitted from an illumination device using a transparent flat light guide plate which did not have the light incident body according to the present invention and had the same dimensions as those of the above-described samples to calculate the efficiency of light propagation. It is to be noted that, in order to eliminate the influence of the thickness of the light guide plate on the micro-structures for light-scattering, no micro-structures for light-scattering were formed on the flat light guide plate for comparison and the flat light guide plates of Samples 1 and 3. The efficiency of light propagation was calculated with the efficiency of light propagation of the illumination device using the flat light guide plate being 100%. The result is shown in FIG. 16. In FIG. 16, the result with regard to Samples 1, 2, and 3 are shown by curves 45, 46, and 47, respectively.

As is clear from FIG. 16, it was found that, with regard to all of Samples 1, 2, and 3, the efficiency of light propagation from the light source to the light guide plate of the illumination device according to the present invention was improved compared with that of the illumination device using a conventional flat light guide plate where the thickness of the light guide plate was in a range of about 150 to 700 μm. Further, with references to the curve 45 of sample 1, the efficiency of light propagation to the light guide plate was at the maximum when the thickness of the light guide plate was about 500 μm.

Further, with regard to the result of both Samples 2 and 3, the efficiency of light propagation was at the maximum when the thickness of the light guide plate was about 300 μm, and over the whole range of the measurement, the efficiency of light propagation with regard to Sample 3 was better than that with regard to Sample 2.

From the above result, it was found that, with respect to light guide plates as thin as about 150 to 700 μm, the efficiency of light propagation from the light source into the light guide plate of the illumination device according to the present invention was better than that of a conventional illumination device.

SPECIFIC EXAMPLE 2

With regard to Sample 3 in Specific Example 1 which is 300 μm thick, concave micro-structures for light-scattering were formed on the underside of the light guide plate within the light guide plate, the micro-structures for light-scattering being right triangles in shape in cross section where the base and the height of the triangle were about 10 μm×30 μm and about 7 μm, respectively (Sample 4). The density of the formed micro-structures for light-scattering was made higher as the distance from the white LEDs increased such that the intensity of light emitted from the light emitting surface of the light guide plate was even.

For comparison, an illumination device using a conventional flat light guide plate which did not have the light incident body according to the present invention was prepared (Comparative Sample 2). The thickness of the light guide plate of Comparison Sample 2 was 300 μm, and the same micro-structures for light-scattering as those of Sample 4 were formed on the underside. The amount of light emitted from the light emitting surface was measured as to Sample 4 and Comparison Sample 2. As a result, the amount of light emitted from the light emitting surface of Sample 4 was larger than that of Comparison Sample 2 by about 35 to 38%. This is in good agreement with the result of Specific Example 1.

SPECIFIC EXAMPLE 3

With regard to Sample 4 prepared in Specific Example 2, light reflectors as illustrated in FIG. 11 were provided at the coupling portion between the light incident body and the light guide plate (Sample 5). Further, with regard to Sample 5, light reflectors as illustrated in FIG. 10 were provided between the white LEDs and the light incident body (Sample 6). The light reflectors used in Samples 5 and 6 were mirror-finished and bent Al plates.

As a result, the amount of light emitted from the light emitting surface of the light guide plate of Sample 5 was larger than that of Sample 4 by about 5 to 7%. Further, the amount of light emitted from the light emitting surface of the light guide plate of Sample 6 was larger than that of Sample 5 by about 6 to 10%.

Embodiment 2

Figure 17:
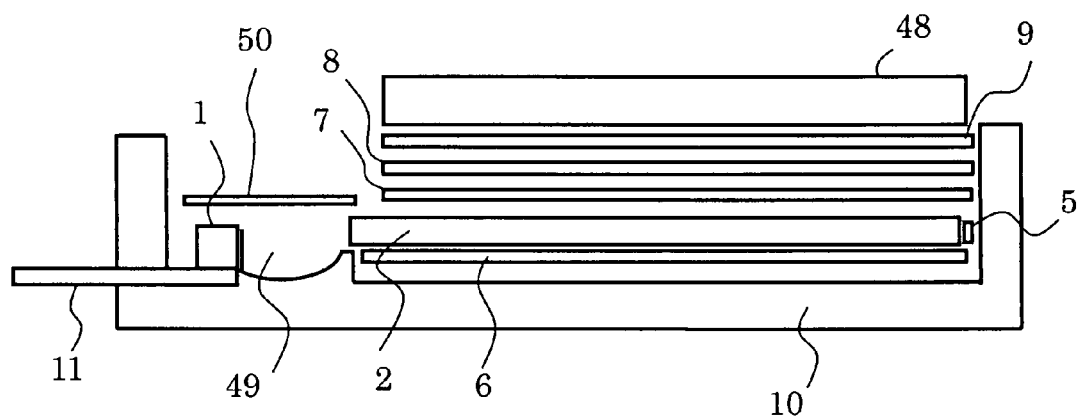
FIG. 17 is a sectional view schematically illustrating a structure of an illumination device according to the present invention.

Although, in the above-described embodiment, the light incident body was formed of polycarbonate or the like formed simultaneously with the light guide plate, the light incident body is not necessarily required to be a resin. More specifically, in order to guide light from the light source to a light incident surface of the light guide plate, an oval surface may be formed between the light source and the light guide plate and a light reflector may be provided so as to oppose the surface. As a member having the oval surface, a casing may be utilized. Such an embodiment is now described with reference to FIG. 17. FIG. 17 schematically illustrates the structure in cross section of a liquid crystal display device of this embodiment. In this embodiment, the oval light incident body is not provided, and by providing an oval surface on a casing 10, an oval space is formed between the light source 1 and the light guide plate 2. The oval space was used as a light incident portion 49. Further, by providing a light reflector 50 at the light incident portion 49 on the opposite side of the casing, the light incident portion 49 produces the same effect as that of the light incident body formed by polycarbonate or the like. This makes the light guide plate 2 have a simple flat structure different from the structure illustrated in Embodiment 1, and processes such as molding can be very easy.

It is to be noted that the light incident portion 49, that is, the space formed by the oval surface and the light reflector, may be filled with a resin. In this way, only by processing an oval surface, a structure having a similar function as that of the light incident body of Embodiment 1 can be formed. A sealing agent such as acrylic, silicone, or epoxy may be used as the resin. Here, phosphor particles or diffusing beads may be dispersed in the encapsulant. The phosphors are formed of a base, an activator, and a solvent. The base is selected from a group consisting of inorganic phosphors such as oxides, sulfides, silicates, and vanadates of zinc, cadmium, magnesium, silicon, and rare-earth element such as yttrium, and organic phosphors such as fluorescein, eosin, oils (mineral oils). The activator is selected from the group consisting of silver, copper, manganese, chromium, europium, zinc, aluminum, lead, phosphorus, arsenic, and gold. Each material is selected for the necessary wavelength. The diffusing beads may be a substance such as $SiO_2$ having a different refractive index than that of the encapsulant resin. By dispersing the diffusing beads, light can be guided to the light guide plate after being diffused at the light incident portion, which makes the emitted light even.

As described in the above, the illumination device according to the present invention can be a thin illumination device with high brightness even if LED light sources of a conventional size are used, which produces an effect that a thin liquid crystal device with high brightness can be realized. More specifically, the light guide plate can have about half the thickness of a conventional light guide plate, and thus, the present invention is effective in making thinner not only liquid crystal display devices but also display devices and illumination devices which require two-dimensional illumination.

Further, by using a thin light guide plate, an illumination device which can flexibly deform the illuminating portion can be realized, and, as a result, there is an effect that the illumination device can also be used as an illumination device for a film display device or the like.

When the illumination device is used as a flexible illumination device, there is also an effect that the illumination method itself has flexibility. For example, when the deformation of the light guide plate is to a small extent, the illumination device can be used as means for supplying even illuminating light or condensed illuminating light, while, when the deformation of the light guide plate is to a large extent, the illumination device can be used as means for realizing illumination having spatial distribution due to leakage light from the deformed portion.

What is claimed is:

1. A display device, comprising:
   a non-self light emitting type display element; and an illumination device for illuminating the display element, the illumination device comprising
   a light source;
   a light guide plate having a light emitting surface;
   a light incident body having a first end portion that has a light incident surface on which light from the light source is incident, and an outer surface portion a part of which has an elliptical shape, the light guide plate and the light incident body being made of the same material; and
   a coupling portion disposed between the light incident body and the light guide plate;
   wherein opposed surface portions of the light guide plate and opposed elliptical surface portions of the light incident body are respectively coupled by opposed planar surface portions that define a wedge shape having a tapered thickness that decreases from the light incident body towards the light guide plate, the planar surface portions being tangential to respective elliptical surface portions of the light incident body.

2. An illumination device for emitting light comprising:
a light source;
a light incident body having a first end portion that has a light incident surface on which light from the source is incident, a second end portion, and an outer surface portion interconnecting the first and second end portions and a part of which has an oval shape; and
a light guide plate optically coupled to the second end portion of the light incident body and having a light emitting surface through which light that propagates through the light incident body is emitted, the light guide plate and the light incident body constituting a one-piece structure;
wherein the second end portion of the light incident body has opposed planner surfaces that taper inwardly in a direction toward the light guide plate.

3. An illumination device according to claim 2; further including light reflectors disposed in opposed relationship over the tapered portion of the light incident body and over a part of the light guide plate.

4. An illumination device according to claim 2; wherein the thickness of the light guide plate is less than the height of the light incident surface in the thickness direction of the light guide plate.

5. An illumination device according to claim 2; further including a plurality of concavities formed on a surface of the light guide plate that is opposite to the light emitting surface, the concavities each having a longitudinal direction and being arranged so that the longitudinal direction extends substantially parallel to a line passing through the concavity and the light source.

6. An illumination device for emitting light comprising:
a light source;
a light guide plate having a light emitting surface;
a light incident body having a first end portion that has a light incident surface on which light from the light source is incident, and an outer surface portion a part of which has an elliptical shape, the light guide plate and the light incident body being made of the same material; and
a coupling portion disposed between the light incident body and the light guide plate;
wherein opposed surface portions of the light guide plate and opposed elliptical surface portions of the light incident body are respectively coupled by opposed planar surface portions that define a wedge shape having a tapered thickness that decreases from the light incident body towards the light guide plate, the planar surface portions being tangential to respective elliptical surface portions of the light incident body.

7. An illumination device according to claim 6; further including light reflectors positioned over the opposed planar portions and the opposed surface portions of a part of the light guide plate.

8. An illumination deive according to claim 6; wherein a top of the light incident body is flush with the light emitting surface of the light guide plate.

9. An illumination device according to claim 6; wherein a rectangular portion is formed on the side of the light source of the light incident body and merges with the elliptical portion; and the light incident surface is provided at the rectangular portion.

10. An illumination device according to claim 6; further including a plurality of concave micro-structures for light-scattering formed on the surface of the light guide plate opposite to the light emitting surface, the plurality of concave micro-structures each having a longitudinal direction and being arranged to have the longitudinal direction arranged substantially in parallel to a line passing through the micro-structures and the light source.

11. An illumination device according to claim 6; wherein the thickness of the light guide plate is less than the thickness of the light incident body.

12. An illumination device according to claim 6; further including a light reflector provided between the light incident body and the light source, the light reflector having an opening at a position corresponding to the light source.

13. An illumination device according to claim 12; wherein a size of the opening is equal to or larger than that of the light emitting surface of the light source.

14. An illumination device for emitting light comprising:
a light source;
a light guide plate having a light emitting surface;
a light incident body having a first end portion that has a light incident surface on which light from the light source is incident, and an outer surface portion a part of which has an oval shape; and
a light reflector provided between the light incident body and the light source, the light reflector having an opening at a position corresponding to the light source;
wherein the light guide plate is integrally coupled, without an intervening air space, to the light incident body, and the light incident body and the light guide plate are made of the same material.

15. An illumination device according to claim 14; wherein a size of the opening is equal to or lager than that of the light emitting surface of the light source.

16. An illumination device according to claim 15; wherein a rectangular portion is formed on the side of the light source of the light incident body and merges with the oval portion; and the light incident surface is provided at the rectangular portion.

* * * * *